(12) United States Patent  (10) Patent No.: US 7,804,623 B2
Gerrits et al.  (45) Date of Patent: Sep. 28, 2010

(54) METHOD FOR CORRECTION OF A TRAPEZOIDAL DISTORTION OF IMAGES

(75) Inventors: Carolus E. P. Gerrits, Velden (NL); Bastiaan J. H Middelbos, Tegelen (NL)

(73) Assignee: Océ-Technologies B.V., Venlo (NL)

( * ) Notice: Subject to any disclaimer, the term of this patent is extended or adjusted under 35 U.S.C. 154(b) by 717 days.

(21) Appl. No.: 11/709,169

(22) Filed: Feb. 22, 2007

(65) Prior Publication Data

US 2007/0195348 A1   Aug. 23, 2007

(30) Foreign Application Priority Data

Feb. 22, 2006  (EP) .................. 06110270

(51) Int. Cl.
 *H04N 1/40* (2006.01)
(52) U.S. Cl. .................. 358/3.26; 382/275
(58) Field of Classification Search .................. 358/1.9, 358/2.1, 3.2, 3.26; 382/215, 275
See application file for complete search history.

(56) References Cited

U.S. PATENT DOCUMENTS

| 5,448,266 | A | 9/1995 | Jamzadeh |
| 6,450,647 | B1 * | 9/2002 | Takeuchi ..................... 353/69 |
| 7,492,495 | B2 * | 2/2009 | Ishihara et al. ..................... 1/1 |
| 2003/0128401 | A1 | 7/2003 | Conrow et al. |
| 2005/0207671 | A1 | 9/2005 | Saito |

* cited by examiner

*Primary Examiner*—Thomas D Lee
*Assistant Examiner*—Stephen M Brinich
(74) *Attorney, Agent, or Firm*—Birch, Stewart, Kolasch & Birch LLP

(57) ABSTRACT

A method for correction of a trapezoidal distortion of images in image processing for improved medium-image registration and also for controlling a printing device by performing the method for correction of a trapezoidal distortion of images in image processing for improved medium-image registration. Also included is a printing device comprising a controller for performing the present methods.

11 Claims, 1 Drawing Sheet

METHOD FOR CORRECTION OF A TRAPEZOIDAL DISTORTION OF IMAGES

This application claims priority from European Patent Application No. 06110270.3 filed on Feb. 23, 2006 in Europe, the entire contents of which are hereby incorporated by reference.

BACKGROUND OF THE INVENTION

The present invention relates to a method for correction of a trapezoidal distortion of images in image processing for achieving improved medium-image registration. The present invention also relates to a method for controlling a printing device by performing a method for the correction of the trapezoidal distortion of images in image processing for achieving improved medium-image registration. The present invention further relates to a printing device comprising a controller for performing the methods according to the present invention.

Pressure differences in an image transfer or transfuse nip of a printing device can cause a medium to change direction. This change in direction introduces an undesirable image length difference of an image registered onto a medium by means of the printing device. In particular, the image length difference is present at opposite sides of the image. Although not quite correct, this type of image deformation is referred to as a trapezoidal distortion. A trapezoidal distortion leads to errors in medium-image registration. It is known to reduce this distortion by adjusting the pressure differences in the printing device with a mechanical setup. The known method to correct trapezoidal distortions has several drawbacks. A major drawback of the known method is that specific, relatively complicated, moveable mechanical parts have to be applied which makes the known method relatively expensive. Moreover, the moving mechanical parts applied are subjected to wear which is detrimental for the reliability of the known method to correct trapezoidal distortions.

SUMMARY OF THE INVENTION

It is an object of the present invention to provide a relatively reliable method to correct trapezoidal distortion in image processing for improved medium-image registration.

This object can be achieved by providing a method according to the present invention, comprising the steps of: A) determining a trapezoidal distortion of an image to be registered, B) calculating the amount and the positioning of linear arrays of image pixels to be omitted or to be added to correct the trapezoidal distortion determined under step A), and C) registering the image onto a medium, wherein the linear image pixels arrays calculated under step B) are omitted or added. By means of computing and adjusting the image to be registered on a medium by selectively omitting and/or adding multiple linear pixels arrays instead of mechanically counteracting the medium orientation, trapezoidal artefacts can be counteracted in a more sophisticated manner. More particularly, since no specific mechanical components are used to perform the correction of trapezoidal distortion, wear of these omitted components can be eliminated, which enhances the reliability of the method according to the present invention. Moreover, since no (expensive) specific mechanical parts are required to perform the method according to the present invention, a trapezoidal correction can be established in a cost-reducing manner. A further advantage of the method according to the present invention is that a trapezoidal distortion can be corrected with an increased accuracy compared to the mechanical correction of the prior art. During step B) the pixel arrays to be omitted or added are determined selectively, thereby avoiding the creation of visible print artefacts during medium-image registration. To realize a smart pattern of omitted or added pixel arrays in order to correct a trapezoidal distortion in the image, it has been found advantageously that during step C) multiple linear image pixel arrays are omitted and/or are added. The method according to the present invention is by no means limited to linear or right-angled images, and may be applied to various kinds of images which are registered onto a medium being subjected to a direction change due to pressure differences in the transfuse nip of a printing device. The method according to the present invention can be applied to an innumerable kind of printing devices, including black and white and color printing devices, which are provided with a transfer nip. In such transfer nip images of marking, particles are transferred from an image-carrying member to an image-receiving member. Such image-receiving member may be a recording medium, such as, e.g., paper, in sheet or in web form. Preferably, the method is applied to printing devices which have a pixel resolution of 1200 dpi or higher in the medium propagation direction to avoid, or at least minimize, visible print artefacts. In the method according to the present invention, in fact the image length, preferably per horizontal trace (oriented in line with the medium propagation direction), is adjusted during image processing. This adjustment is implemented as a pixel removal or addition that selects the pixels in a smart pattern with the goal to minimize print artefacts. It has been shown by experiments that this adjustment enables one to accurately correct trapezoid shapes without introducing print artefacts.

Commonly, an image printed by a printing device exists de facto of a substantial amount of pixels. Preferably, the pixels used to register the image during steps A)-C) are pixels reproduced by means of a half-toning technique. More preferably, the linear pixel arrays to be omitted or added during step B) are formed by arrays of pixels being reproduced by means of a half-toning technique. An advantage of applying the method for correction of trapezoid distortion according to the present invention on half-tone pixels rather than on grey scale pixels is that by doing so image sharpness deterioration can be prevented.

In this context it is noted that half-toning is a generally known and a widely used technique to convert a continuous tone image or grey scale image, wherein in digital representation each pixel has for each process color a tone value selected out of 256 possible tones values (typically for an 8-bit representation), into a half-tone image. This makes the method according to the present invention ideally suited to be performed by a printing device, such as an inkjet or laser printer, as present printing devices are only capable of rendering a limited number of tones per pixel. Mostly, per color even only a single tone per pixel can be rendered, i.e., either a dot is printed or not.

Various techniques are available to convert continuous tone or grey-value images into half-tone images without losing a shaded overall impression of the printed image. These techniques all make use of the integrating power of the human eye whereby images built up of a sufficient number of small dots are perceived by the observer as a uniform surface. These techniques are generally referred to by the collective names of "half-toning techniques" and "half-tone processing." Half-toning techniques can be classified into two main categories: Amplitude Modulated (AM) half-toning and Frequency Modulated (FM) half-toning. In AM half-toning half-tone cells are laid out on a grid with a fixed spatial frequency and angle. The tone is modulated by varying the size of the half-tone element (amplitude). In FM half-toning the half-tone element size is constant and may be chosen equal to the size of one pixel but the average distance between the elements (frequency) is varied to produce a certain tone. In contrast to AM half-toning there are no fixed frequencies or angles. FM half-toning can be further divided into two subcategories: dithering (stochastic or non-stochastic) and error diffusion. As mentioned afore said half-toning techniques are described in detail in the literature and therefore require no further explanation.

In a preferred embodiment the linear pixel arrays to be omitted or to be added have a length up to the width of the image to be registered during step C). Since the length of the linear pixel arrays to be omitted or to be added does not exceed the width of the image (extending in a direction substantially perpendicular to a processing direction of the medium), generation of visible print artefacts beyond the image can be prevented.

Preferably, the linear image pixel arrays extend in a direction substantially perpendicular to a processing direction of the medium to enable a relatively simple and efficient selective omission or addition of image pixels. More preferably, the linear image pixel arrays run substantially parallel with each other. The determination by calculation of linear image pixel arrays to be omitted or added can be established in different manners. To this end, it is conceivable to consider the (y-oriented) print traces in line with the medium processing direction separately and to determine per y-oriented trace, or per group of neighbouring y-oriented traces, the amount of pixels to be omitted or added, wherein the pixels to be omitted or to be added are spread substantially smoothly over each y-oriented trace. According to this embodiment, commonly a staggered orientation of omitted or added pixels (or x-oriented pixel arrays) will be realized viewed in a direction perpendicular to the medium processing direction. According to another embodiment of the method according to the present invention the y-oriented traces, or groups of neighboring y-oriented traces, are considered, and by calculation the amount of pixels to be omitted or to be added is determined, wherein the pixels to be omitted or added are positioned at a level of vicinal pixels of a neighboring y-oriented trace, or group of y-oriented traces, so as to form x-oriented linear image pixel arrays (perpendicular to the medium processing direction), each image pixel array extending over an x-oriented trace being perpendicular to the medium processing direction. The lengths of the image pixel arrays are preferably, mutually different, wherein the image pixel arrays are more preferably oriented substantially arbitrary. However, preferably, the image pixel arrays are positioned substantially equidistantly, substantially randomly, and substantially parallel to avoid (visible) print artefacts. Moreover, the image pixel arrays preferably extend to a side of the image to be printed, tending to be deformed (extended) during medium-image registration.

The present invention also relates to a method for controlling a printing device by performing the method for correction of a trapezoidal distortion of images in image processing, comprising the steps of: A) determining a trapezoidal distortion of an image to be printed, B) calculating the amount and the positioning of the linear arrays of image pixels to be omitted or to be added to correct the trapezoidal distortion determined under step A), and C) printing the image onto a medium, wherein the linear image pixel arrays calculated according to step B) are omitted or added. The advantages of the method according to the present invention have been elucidated above in a comprehensive manner. In one embodiment, the trapezoidal distortion of an image to be printed according to step A) is determined by determining a pressure difference in a transfer or transfuse nip of the printing device. Determining the pressure difference in the transfer or transfuse nip for advancing a medium is relatively simple, and this pressure difference causes an advancing medium to change direction, as a result of which a trapezoidal distortion will occur. For instance, a reference image may be printed on a medium in order to measure the trapezoidal distortion after the image is printed on the medium. Based on these measurements, corrections are determined such that trapezoidal image distortion in subsequently printed images is avoided or at least severely reduced. These measurements and corrections may be determined and used dependent on the kind of medium.

The present invention further relates to a printing device comprising a controller for performing the present method(s). The printing device can be any printer regardless of the image forming process. Examples of printing devices are a laser printer, an ink jet printer, and a dot matrix printer.

BRIEF DESCRIPTION OF THE DRAWINGS

The present invention will be illustrated by means of the following non-limitative embodiment, wherein.

DETAILED DESCRIPTION OF THE INVENTION

Figure 1:
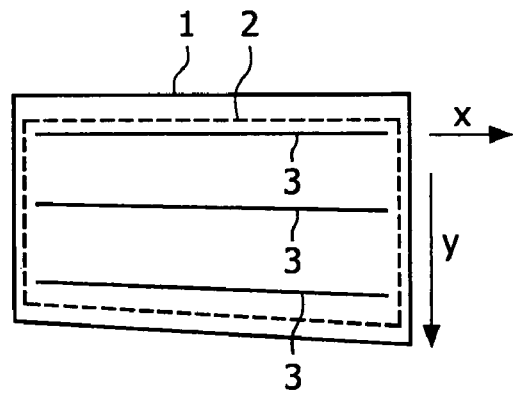
FIG. 1 shows a schematic view of a medium sheet on which a trapezoidal distorted image is printed.

FIG. 1 shows a schematic view of a sheet 1 on which a trapezoidal distorted image 2 is printed. Due to pressure differences in a transfuse nip of a printing device the speed of an advancing sheet in the sheet processing direction (arrow y) is larger at the right side of the sheet 1 (as shown) than at the left side of the sheet 1 causing a trapezoidal distortion of the image 2 as shown. In this case the trapezoidal distortion direction coincides with the sheet processing direction (arrow y). Image lines 3 which should be registered in parallel are in fact registered as an undesired trapezoidal distortion.

Figure 2A:
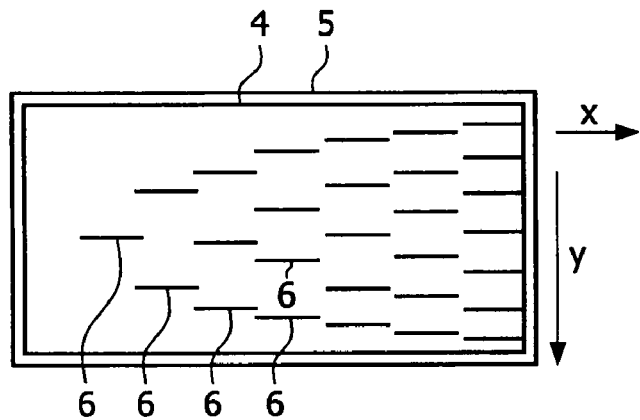
FIG. 2a shows a schematic view of an image printed on a medium sheet, wherein a trapezoidal distortion of said image is corrected by performing an embodiment of the method according to the present invention.

FIG. 2a shows a schematic view of an image 4 printed on a sheet 5, wherein a trapezoidal distortion of said image 4 is corrected by performing an embodiment of the method according to the present invention. For correcting, and hence avoiding the trapezoidal distortion of the image 4 the (y-oriented) print traces substantially in line with the sheet processing direction are considered separately. Per group of neighboring y-oriented traces, the amount of pixels to be omitted or to be added is determined to correct the trapezoidal distortion, wherein the pixels to be omitted or to be added are spread substantially smoothly over each y-oriented print trace so as to form x-oriented omitted or added image pixel arrays 6 substantially perpendicular to the sheet processing direction.

Adding pixel array can, for instance, be done by duplicating the pixel values of a contiguous pixel array or by interpolating between the pixel values of contiguous pixel arrays. According to this embodiment, commonly, a staggered orientation of omitted or added pixel arrays 6 is realized. However, the pixel arrays 6 are all oriented substantially parallel, wherein the length of each pixel array 6 corresponds to the width of the group of neighboring y-oriented print traces. By performing the method according to the present invention the image 4 registered onto the sheet 5 corresponds to the image which actually had to be registered by the printing device.

Figure 2B:
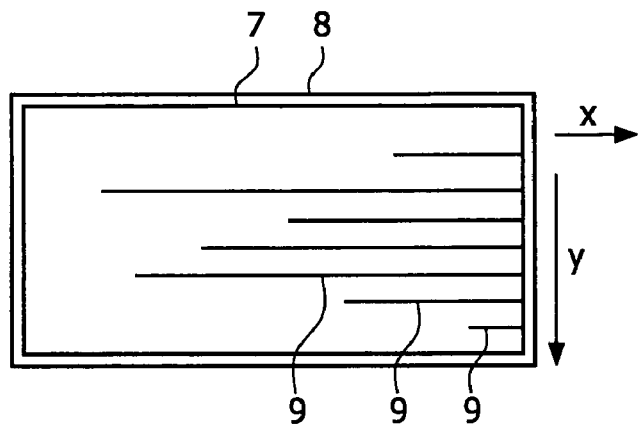
FIG. 2b shows a schematic view of an image printed on a medium sheet, wherein a trapezoidal distortion of said image is corrected by performing another embodiment of the method according to the present invention.

FIG. 2*b* shows a schematic view of an image 7 printed on a sheet 8, wherein a trapezoidal distortion of said image is corrected by performing another embodiment of the method according to the present invention. According to this embodiment of the method, groups of neighboring y-oriented traces are considered and by calculation the amount of pixels to be omitted or to be added to avoid trapezoidal distortion is determined, wherein the pixels to be omitted or to be added are positioned at a level of vicinal pixels of a group of y-oriented traces so as to form omitted or added linear image pixel arrays 9, each image pixel array 9 extending over an x-oriented trace being perpendicular to the sheet processing direction (shown as arrow y). The lengths of the omitted or added image pixel arrays 9 are mutually different, wherein the omitted or added image pixel arrays 9 are spread in the sheet processing direction, such that the omitted or added image pixel arrays 9 are positioned substantially equidistantly, substantially randomly, and substantially parallel to avoid (visible) print artefacts. As can be seen in this figure all omitted or added image pixel arrays 9 extend to a side of the image 8 tending to deform due to pressure differences in a transfuse nip of the printing device (see FIG. 1), which deformation is presently avoided by applying the method according to the present invention.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim.

The invention claimed is:

1. A method for correction of a trapezoidal distortion of images in image processing for improved medium-image registration, comprising the steps of:
   A) determining the trapezoidal distortion of an image to be registered,
   B) calculating a pattern of linear arrays of image pixels to be omitted or to be added to correct for the trapezoidal distortion determined under step A), which pattern comprises an amount and a positioning of the linear-arrays, and
   C) registering the image onto a medium , wherein the multiple linear image pixel arrays calculated under step B) are omitted or added,
wherein pixels reproduced by means of a half-toning technique are used to register the image during steps A)-C).

2. The method according to claim 1, wherein the linear pixel arrays to be omitted or added during step B) are formed by arrays of pixels being reproduced by means of the half-toning technique.

3. The method according to claim 1, wherein the linear pixel arrays to be omitted or to be added have a length up to the width of the image to be registered during step C).

4. The method according to claim 1, wherein the linear image pixel arrays extend in a direction transverse to the trapezoidal distortion direction.

5. The method according to claim 3, wherein the linear image pixel arrays run substantially parallel with each other.

6. The method according to claim 4, wherein the linear image pixel arrays run substantially parallel with each other.

7. The method according to claim 4, wherein the lengths of the linear image pixel arrays are mutually substantially different.

8. The method according to claim 5, wherein the lengths of the linear image pixel arrays are mutually substantially different.

9. A method for controlling a printing device by performing the method according to claim 1, comprising the steps of:
   A) determining a trapezoidal distortion of an image to be printed,
   B) calculating a pattern of linear arrays of image pixels to be omitted or to be added to correct the trapezoidal distortion determined under step A), which pattern comprises an amount and a positioning of the linear arrays, and
   C) printing the image onto a medium, wherein the linear image pixels arrays calculated according to step B) are omitted or added,
wherein according to step A) the trapezoidal distortion of an image to be printed is determined by determining the pressure difference in a transfuse nip of the printing device.

10. A printing device comprising a controller for performing the method according to claim 9.

11. A method for correction of a trapezoidal distortion of images in image processing for improved medium-image registration, comprising the steps of:
   A) determining the trapezoidal distortion of an image to be registered,
   B) calculating a pattern of linear arrays of image pixels to be omitted or to be added to correct for the trapezoidal distortion determined under step A), which pattern comprises an amount and a positioning of the linear-arrays, and
   C) registering the image onto a medium, wherein the multiple linear image pixel arrays calculated under step B) are omitted or added,
wherein the linear pixel arrays to be omitted or to be added have a length up to the width of the image to be registered during step C), and wherein the lengths of the linear image pixel arrays are mutually substantially different and oriented substantially randomly.

* * * * *